March 29, 1960     J. J. BISHOP ET AL     2,930,134
BORE MEASURING DIAL GAUGE
Filed Nov. 6, 1956
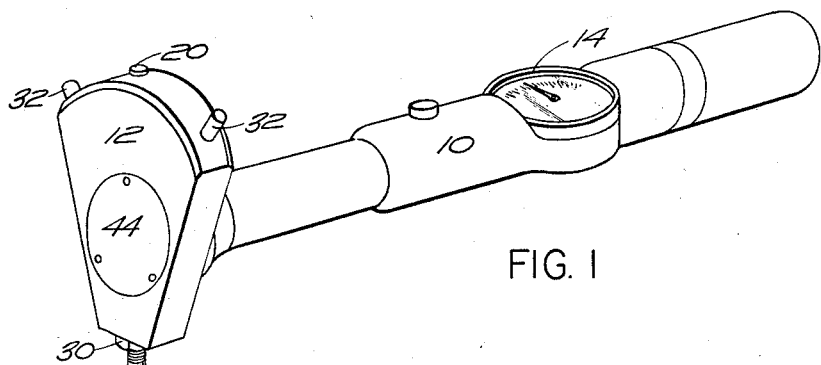
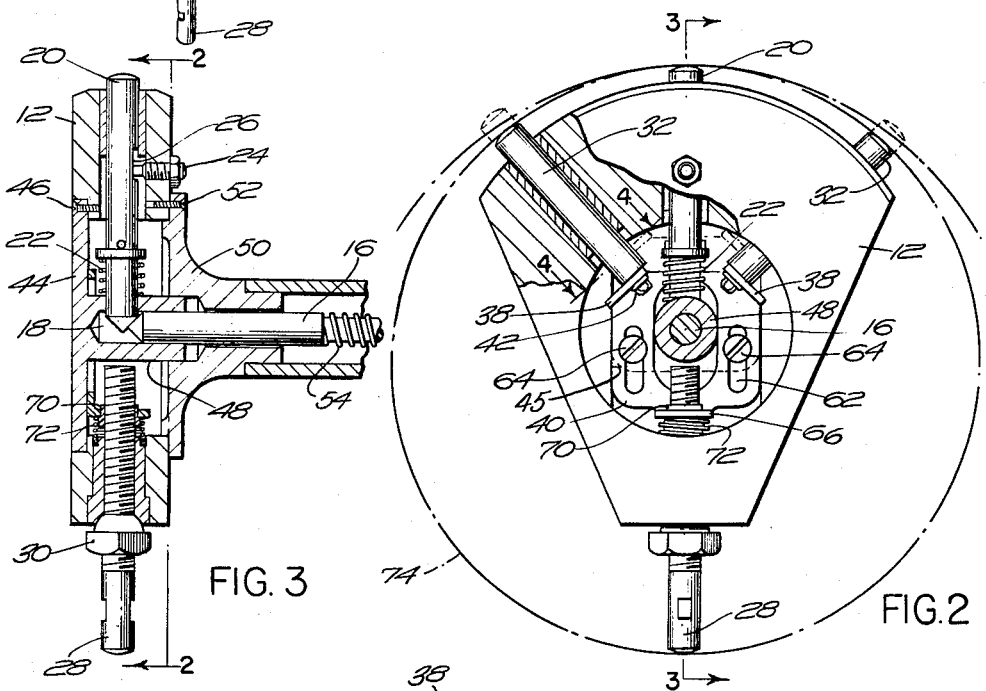
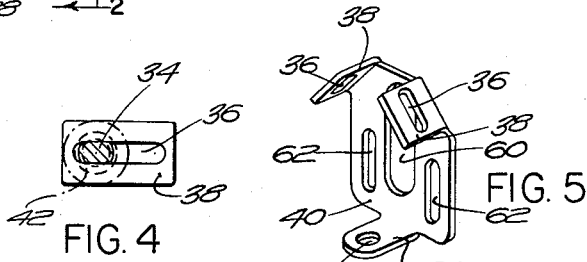
INVENTORS
JOHN J. BISHOP
FLOYD C. SHAFFER
BY
Kenway, Jenney, Witter & Hildreth
ATTORNEY

2,930,134

BORE MEASURING DIAL GAUGE

John J. Bishop, Templeton, and Floyd C. Shaffer, Athol, Mass., assignors to The L. S. Starrett Company, Athol, Mass., a corporation of Massachusetts Application November 6, 1956, Serial No. 620,623

6 Claims. (Cl. 33—178)

This invention relates to bore measuring dial gauges of the type employing two plungers for centralizing the gauging plungers in true diametrical position within a bore to be gauged. The invention more particularly comprises novel means, including a member mounted for limited movement in opposite directions through a predetermined path and connected to the centralizing plungers in a manner adapted to move them inwardly and outwardly respectively and in equal degree upon said opposite direction movements of the member and maintain the plungers against rotation. Thus the member serves as a relatively simple equalizer for both plungers, requiring them to work together synchronously and thereby function with equal balance and maximum accuracy. The production of a novel mechanism of this nature and for the purpose described comprises the primary object of the invention.

These and other features of the invention will be best understood and appreciated from the following description of a preferred embodiment thereof selected for purposes of illustration and shown in the accompanying drawing, in which—

Fig. 1 is a perspective view of a bore measuring dial gauge embodying our invention, Fig. 2 is a view taken on line 2—2 of Fig. 3 and partially broken away, Fig. 3 is a sectional view taken on line 3—3 of Fig. 2, Fig. 4 is a fragmental view taken on line 4—4 of Fig. 2, and Fig. 5 is a perspective view of a sliding plate shown in Fig. 2.

In the drawing 10 indicates the supporting stem of the gauge having a measuring head 12 on its inner end and carrying a dial indicator 14. A plunger 16 is slidably mounted axially in the stem and cooperates with the dial indicator in well known manner to register thereon the axial movements of the plunger. The other end of the plunger extends into the head 12 and is beveled at a 45° angle to cooperate with a like bevel 18 on the inner end of a gauging plunger 20 slidably mounted in the head radially of the plunger 16. An expansion spring 22 normally forces the gauging plunger 20 outwardly and a stop screw 24 threaded into the head and cooperating with a flat 26 on the gauging plunger limits axial movement of the plunger and prevents its rotation. In axial alignment and cooperating with the plunger 20 at the opposite side of the head is a fixed gauging element 28 threaded into the head. The element is adjustable axially in the head and is secured in adjusted position by a lock nut 30.

The primary object of the invention resides in the production of improved mechanism for centralizing the gauging plunger 20 and its cooperating element 28 on the true diameter of a bore to be gauged. For this purpose we provide two centralizing plungers 32 slidably mounted in and extending outwardly of bores in the head respectively at opposite sides of the gauging plunger 20. The inner ends of the plungers 32 are reduced in diameter at 34 and provided with oppositely disposed flats by which each end 34 fits slidably within a slot 36 in an ear 38 bent upwardly and right angularly from a plate 40. The end 34 of each plunger 32 is grooved to receive a retaining ring 42 to prevent its withdrawal from the slot 36, thus providing a direct push and pull connection between each plunger 32 and the plate 40. The retaining rings are removable and thus allow the equalizing plungers to be easily assembled and disassembled. The plate is mounted for limited sliding movement in the head in a direction axially of the gauging plunger 20 and the parts are so disposed that axial movement in either direction of either plunger 32 moves the plate 40 and causes the other plunger to move axially in the same direction and in equal degree. It will be apparent that such function results from the direct push and pull connection between the plungers 32 and the plate 40.

The head 12 is recessed at its forward face to receive a closure plate 44 adapted to be secured flush with said face by screws 46. Integral with the closure plate and extending inwardly from its inner face and in axial alignment with the stem 10 is a tubular stem 48. The tubular stem extends telescopically into a member 50 carried by and comprising a part of the stem 10 and the tubular stem receives the plunger 16 thereinto as shown in Fig. 3. The tubular stem is also provided with a lateral bore receiving the gauging plunger 20. The stem 10 is secured to the head 12 by screws 52 extending through the member 50 and threaded into the head 12. A compression spring 54 on the plunger 16 normally forces this plunger forwardly into contact with the gauging plunger 20.

The inner face of the closure plate 44 is recessed to provide a channel guideway 45 for the plate 40. The plate 40 is recessed at 60 to receive the tubular stem 48 and at 62 to receive two screws 64 securing the plate 40 in the channel 45 and to the plate 44, such recesses being elongated to permit sliding movement of the plate axially of the plunger 20 as illustrated in Fig. 2. An ear 66 on the plate 40 is perforated at 68 to receive the inner end of the gauging element 28 and a bushing 70 fixed within the perforation is adapted to slide freely on and along the element. A compression spring 72 rearwardly of the bushing normally moves the plate 40 outwardly to the broken line position of Fig. 2.

The gauging operation is illustrated in Fig. 2 wherein the gauging head 12 is shown as inserted into a hole 74 to be gauged. The gauging plunger 20 and centralizing plungers 32 normally project outwardly beyond the wall of a hole to be gauged and when the gauge is inserted into the hole these plungers will be forced rearwardly as illustrated in Fig. 2. The head is then rocked to a position wherein it has 3-point contact with the hole wall at the gauging element 28 and the two centralizing plungers 32, thus positioning the gauging members 20 and 28 on the true diameter of the hole. It will be apparent that the combining of the two plungers 32 with the plate 40 requires the two plungers to work together synchronously and thereby function with equal balance and maximum accuracy.

Having thus disclosed our invention what we claim as new and desire to secure by Letters Patent is—

1. In a bore measuring dial gauge having a head on one end of a supporting stem, a plunger in the stem, means for transmitting movement of the plunger to a dial indicator on the stem and a gauging plunger slidably mounted in the head radially of and cooperating with the first named plunger; the combination of two independent centralizing plungers slidably mounted in and extending outwardly of two bores diverging outwardly in the head respectively at opposite sides of the gauging plunger, a member mounted for limited forward and rearward sliding movement in the head axially of the gauging plunger, means providing direct push and pull connections between the inner ends of the centralizing plungers and said member to move the centralizing plungers equally and axially outwardly and inwardly in said bores upon said movement of the member, and resilient means normally maintaining the member in a position projecting the centralizing plungers outwardly of said bores.

2. The gauge defined in claim 1 plus a spring coaxial with the gauging plunger at one side of the first named plunger for normally projecting the gauging plunger outward, said resilient means comprising a spring at the opposite side of the first named plunger.

3. The gauge defined in claim 1 in which the means connecting the centralizing plungers with said member comprises slots in the member receiving the inner ends of the centralizing plungers and cooperating flats on the plungers and member at the slots preventing rotation of the plungers in the slots.

4. The gauge defined in claim 1 in which said member comprises a plate mounted for said sliding movement in a guideway in the head and having fixed thereto two ears at the inner ends of the centralizing plungers and converging toward the gauging plunger, said ears being disposed right angularly to the centralizing plungers and having slots therein converging toward the gauging plunger, the inner ends of the centralizing plungers engaging in said slots and having flat to flat contact with the ears for preventing rotation of the plungers in the slots.

5. In a bore measuring dial gauge having a head on one end of a supporting stem, a plunger in the stem, means for transmitting movement of the plunger to a dial indicator on the stem and gauging plunger slidably mounted in the head radially of and cooperating with the first named plunger; the combination of two independent centralizing plungers slidably mounted in and extending outwardly of two bores diverging outwardly in the head respectively at opposite sides of the gauging plunger, a member mounted in the head for limited movement in opposite directions through a predetermined path, means providing direct push and pull connections between the centralizing plungers and said member for effecting axial and equal movement of the centralizing plungers in said bores forwardly and rearwardly respectively and synchronously with the opposite direction movements of the member, and resilient means normally moving the member in one of said directions projecting the centralizing plungers outwardly of said bores.

6. The gauge defined in claim 5 plus a removable closure plate carried by said head and supporting said member thereon for movement through said predetermined path, a tubular stem in the head integral with the closure plate and disposed axially of and receiving the first named plunger thereinto, the free end of the tubular stem fitting telescopically within the adjacent end of the first named stem.

References Cited in the file of this patent

UNITED STATES PATENTS

| | | |
|---|---|---|
| 2,095,405 | Aldeborgh et al. | Oct. 12, 1937 |
| 2,241,287 | Westcott | May 6, 1941 |
| 2,385,157 | Nilsson et al. | Sept. 18, 1945 |
| 2,438,274 | Eisele | Mar. 23, 1948 |
| 2,566,160 | Bowers | Aug. 28, 1951 |
| 2,601,496 | Boat | June 24, 1952 |
| 2,654,157 | Eisele | Oct. 6, 1953 |
| 2,775,820 | Worthen | Jan. 1, 1957 |

FOREIGN PATENTS

| | | |
|---|---|---|
| 646,248 | Great Britain | Nov. 15, 1950 |